June 2, 1925.  C. W. HOLMES ET AL  1,540,627

SPECTACLE BRIDGE REST

Filed Aug. 31, 1922

Inventors
C. W. Holmes and
S. C. Hassler,
By
Attorney

Patented June 2, 1925.

1,540,627

UNITED STATES PATENT OFFICE.

CHARLES W. HOLMES AND SAMUEL C. HASSLER, OF LIBERTY, MISSOURI.

SPECTACLE BRIDGE REST.

Application filed August 31, 1922. Serial No. 585,468.

*To all whom it may concern:*

Be it known that CHARLES W. HOLMES and SAMUEL C. HASSLER, citizens of the United States of America, residing at Liberty, in the county of Clay and State of Missouri, have invented new and useful Improvements in a Spectacle Bridge Rest, of which the following is a specification.

The object of the invention is to provide a simple and efficient means for use in connection with the bridge of spectacles for preventing the scarring or cutting of the flesh or skin of the wearer's nose incident to the weight of the spectacles and the comparative narrowness of bearing of the bridge on the ridge of the nose; and furthermore to provide a device for the purpose indicated which may be readily applied to and removed from spectacles already in use so that the same may be employed and marketed as an attachment adaptable to commercial types of spectacles; and with these objects in view the invention consists in a construction and combination of parts of which a preferred embodiment is shown in the accompanying drawings, wherein:—

Figure 1:
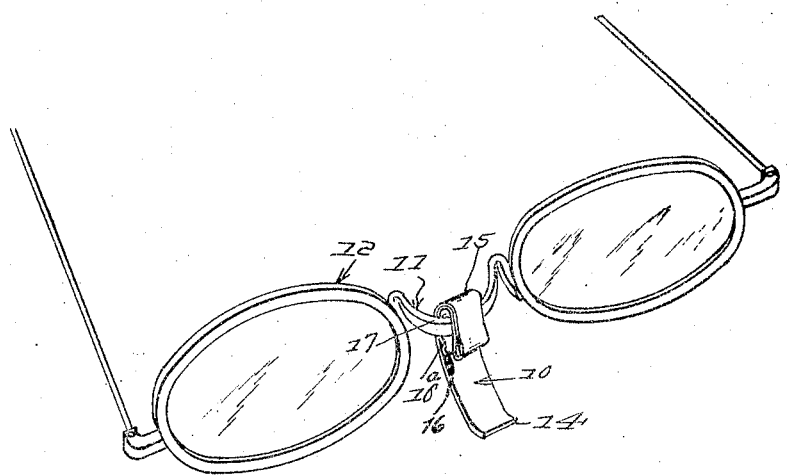
Figure 1 is a view of a pair of spectacles of which the bridge is fitted with a rest constructed in accordance with the invention.
Figure 2:
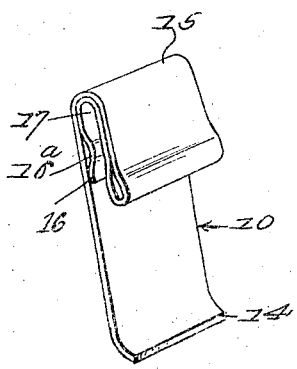
Figure 2 is a detail view of the bridge rest detached.
Figure 3:
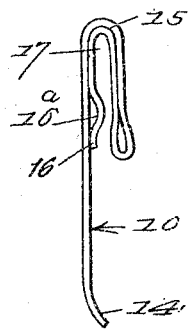
Figure 3 is an edge view of the bridge rest.

The rest 10 consists of a leaf of preferably yielding or spring material such as thin metal, celluloid, hard rubber or the equivalent thereof engaged at its upper end with a bridge 11 of the spectacles 12 to relieve the nose of the wearer of the pressure of the bridge and constitute the extended bearing upon the nose of the wearer as distinguished from the comparatively narrow transverse bearing of the ordinary bridge. The leaf is extended in the direction of the length of the nose of the wearer or in a direction perpendicular to the plane of the bridge and should be of sufficient flexibility to adapt it to be shaped to conform to that of the ridge of the nose in connection with which it is to be worn by giving it a necessary curvature in one direction or another,—to-wit either convexed or concaved at its rear side, the lower terminal of the same being deflected outwardly or forwardly as indicated at 14.

The rest may be attached permanently to the bridge but preferably is detachably engaged therewith to permit of its being applied to spectacles already in use, and of being removed from time to time as may be desired by the wearer, and to this end as indicated in the drawing it is provided with a spring loop 15 formed by folding the upper end of the leaf upon itself and turning the extremity of the loop inward and upward to form a spring tongue 16 with a transverse depression or seat 17 to fit the bridge. This construction provides for slipping the rest into and out of engagement with the bridge and adapting it to snap into place and be held against accidental displacement while affording a substantially broad bearing surface for contact with the ridge of the wearer's nose. The tongue 16 has a protrusion 16ª which cooperates with the loop to prevent displacement of the rest, especially when the spectacles are in position on the nose.

Having described the invention, what is claimed as new and useful is:—

A spectacle bridge rest comprising a single leaf of material of substantial elongated form with one end adapted for bearing engagement with the ridge of the nose, the other end of the leaf being bent to form a loop, one wall of the loop being rebent within and conforming to the loop, causing a seat to be formed for the reception of the bridge, the terminal of the rebent portion having a bulge a short distance below the crotch of the seat to retain the bridge engaged in the seat.

In testimony whereof they affix their signatures.

CHARLES W. HOLMES.
SAMUEL C. HASSLER.